United States Patent
Yao et al.

(10) Patent No.: US 8,437,045 B2
(45) Date of Patent: May 7, 2013

(54) BITMAPPED BASED TRAPPING METHODS, APPARATUS AND SYSTEM BY MODIFYING NON-BLACK HALFTONE PIXEL BITMAP PLANE USING ESTIMATED CONTINUOUS TONE VALUE

(75) Inventors: Meng Yao, West Linn, OR (US); John A. Handwork, Clackamas, OR (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 859 days.

(21) Appl. No.: 12/548,783

(22) Filed: Aug. 27, 2009

(65) Prior Publication Data
US 2011/0051197 A1    Mar. 3, 2011

(51) Int. Cl.
*H04N 1/405* (2006.01)
*H04N 7/30* (2006.01)

(52) U.S. Cl.
USPC ........... 358/3.06; 358/1.9; 358/2.1; 358/3.01; 358/3.13; 358/3.24; 358/500; 358/518; 358/534; 358/462; 382/162; 382/166; 382/167; 382/251; 382/253; 347/15; 347/43

(58) Field of Classification Search ................. None
See application file for complete search history.

(56) References Cited

U.S. PATENT DOCUMENTS

| | | | |
|---|---|---|---|
| 5,784,172 A | 7/1998 | Coleman | |
| 5,923,821 A | 7/1999 | Birnbaum et al. | |
| 5,960,163 A * | 9/1999 | Nickell et al. | 358/1.9 |
| 6,353,687 B1 * | 3/2002 | Schweid | 382/252 |
| 7,009,735 B2 | 3/2006 | Ebner | |
| 7,048,349 B2 * | 5/2006 | Yao et al. | 347/15 |
| 7,246,880 B2 * | 7/2007 | Ross et al. | 347/43 |
| 8,077,353 B2 * | 12/2011 | Wada | 358/1.9 |
| 2007/0236740 A1 * | 10/2007 | Yao | 358/3.06 |

* cited by examiner

*Primary Examiner* — Steven Kau
(74) *Attorney, Agent, or Firm* — Fay Sharpe LLP

(57) ABSTRACT

Provided are bitmap based trapping methods, apparatus and systems. According to one exemplary method, black trapping color image data is performed by estimating the continuous tone values associated with non-black pixels near a qualified black pixel and subsequently, the estimated continuous tone values are halftoned at the qualified black pixel locations and ORed with the original bitmap data.

18 Claims, 5 Drawing Sheets

BITMAPPED BASED TRAPPING METHODS, APPARATUS AND SYSTEM BY MODIFYING NON-BLACK HALFTONE PIXEL BITMAP PLANE USING ESTIMATED CONTINUOUS TONE VALUE

CROSS REFERENCE TO RELATED PATENTS AND APPLICATIONS

The following application, the disclosure of which being totally incorporated herein by reference is mentioned:

U.S. patent application publication No. 2007/0236740 by Meng Yao, entitled "BITMAP BASED TRAPPING," published on Oct. 11, 2007.

BACKGROUND

The subject disclosure is generally directed to trapping on color printers.

Raster type printers, which have been implemented with various print engines such as electrostatographic print engines and ink jet print engines, commonly employ halftoning to transform continuous tone image data to print data that can be printed as an array of dots that can be of substantially similar size. For example, 8 bit per pixel per primary continuous tone image data can be halftoned to 4-bit or one-bit data per pixel per primary color. A frequently encountered problem in color printing is misregistration of the color planes, which can cause objectionable artifacts. For example, when black text is printed on a color background, misregistration of black relative to the other colors can cause a white gap between the black text and the color background. Other kinds of print engine problems, such as trailing edge deletion, where toner at the trailing edge fails to transfer, can cause similar artifacts. Trapping can be used to compensate for these problems by overlapping the colors near the edge so that there is no white gap when misregistration or trailing edge deletion happens. For example, the background color can be added to the black pixels near the black text edge.

U.S. patent application publication No. 2007/0236740 discloses a bitmap-based approach to perform black trapping. For each black pixel qualified for trapping, an algorithm evaluates pixels in each color plane that are found using the corresponding halftone screen vectors. If these pixel locations contain color, the corresponding color is added to the black pixel location. This allows the color halftone dots to extend beyond the black edges, thus eliminating white gaps according to an exemplary embodiment. Notable, the '740 patent application publication does not control the depth of trapping and requires a relatively large number of scan lines to find neighboring cells using halftone screen vectors.

BRIEF DESCRIPTION

One disclosed feature of the embodiments is a method of performing black trapping on a color image data representation for rendering comprising a) receiving a continuous tone data representation of a color image; b) generating a halftone pixel bitmap representing the color image, the halftone pixel bitmap including a black halftone pixel bitmap plane and one or more non-black pixel bitmap planes; c) identifying a qualified black pixel which is located substantially near a non-black pixel; d) estimating the continuous tone value associated with non-black pixels within a predetermined window of pixels associated with the qualified black pixel; and e) modifying the non-black halftone pixel bitmap plane at the qualified black pixel location using the estimated continuous tone value associated with the non-black pixels.

Another disclosed feature of the embodiments is a computer program product comprising a computer-usable data carrier storing instructions that, when executed by a computer, cause the computer to perform a method of black trapping on a color image data representation for rendering, the method comprising a) receiving a continuous tone data representation of a color image; b) generating a halftone pixel bitmap representing the color image, the halftone pixel bitmap including a black halftone pixel bitmap plane and one or more non-black pixel bitmap planes; c) identifying a qualified black pixel which is located substantially near a non-black pixel; d) estimating the continuous tone value associated with non-black pixels within a predetermined window of pixels associated with the qualified black pixel; and e) modifying the non-black halftone pixel bitmap plane at the qualified black pixel location using the estimated continuous tone value associated with the non-black pixels.

Still another disclosed feature of the embodiments is a printing apparatus comprising an image marking device for rendering a color image on a media substrate; and a controller configured to receive a continuous tone representation of an image for rendering on the image marking device, the controller configured to execute instructions to perform a method of black trapping on the contone representation of the image, the method comprising a) receiving a continuous tone data representation of a color image; b) generating a halftone pixel bitmap representing the color image, the halftone pixel bitmap including a black halftone pixel bitmap plane and one or more non-black pixel bitmap planes; c) identifying a qualified black pixel which is located substantially near a non-black pixel; d) estimating the continuous tone value associated with non-black pixels within a predetermined window of pixels associated with the qualified black pixel; and e) modifying the non-black halftone pixel bitmap plane at the qualified black pixel location using the estimated continuous tone value associated with the non-black pixels.

DETAILED DESCRIPTION

The present disclosure provides bitmap based black trapping methods, apparatus and systems. According to an exemplary embodiment, halftoned image data is received as an input, an algorithm identifies black pixels qualified for black trapping, the algorithm estimates the C, M and Y continuous-tone values for an area around a qualified black pixel by using the largest thresholds for the C, M and Y halftone screens corresponding to the on-pixels in the area, and then the algorithm re-halftones the C, M and Y pixels at the qualified black pixel locations using the estimated continuous-tone values. The results are ORed with the original image data.

Another feature of the disclosed black trapping methods, apparatus and systems is the ability to control the depth of trapping. Stated another way, the algorithms executed check if a non-black pixel is within a predetermined neighborhood around a selected black pixel. The size of the neighborhood, i.e. 1×1, 2×2, 3×3, etc., provides the depth of trapping as will be further explained below.

With reference to FIGS. 1-4, a detailed description of a printing system, an associated pixel array and black edge on a halftoned cyan background, and halftone screen vectors is provided to further describe an exemplary embodiment of the disclosed printing system and illustrate the applicability of the disclosed algorithm to black edges.

Figure 1:
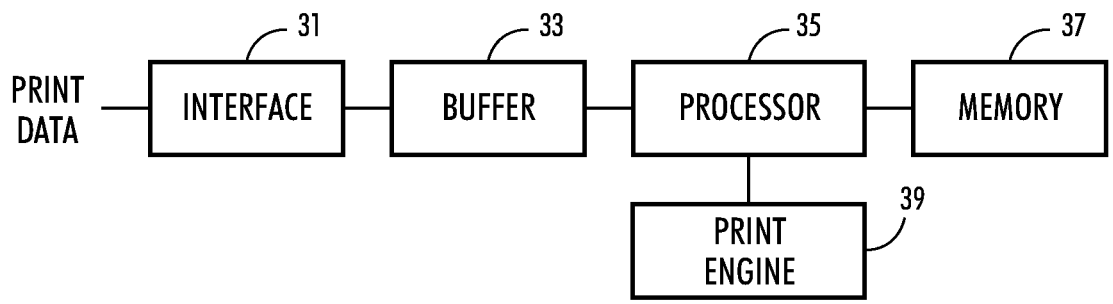
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrostatographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 2:
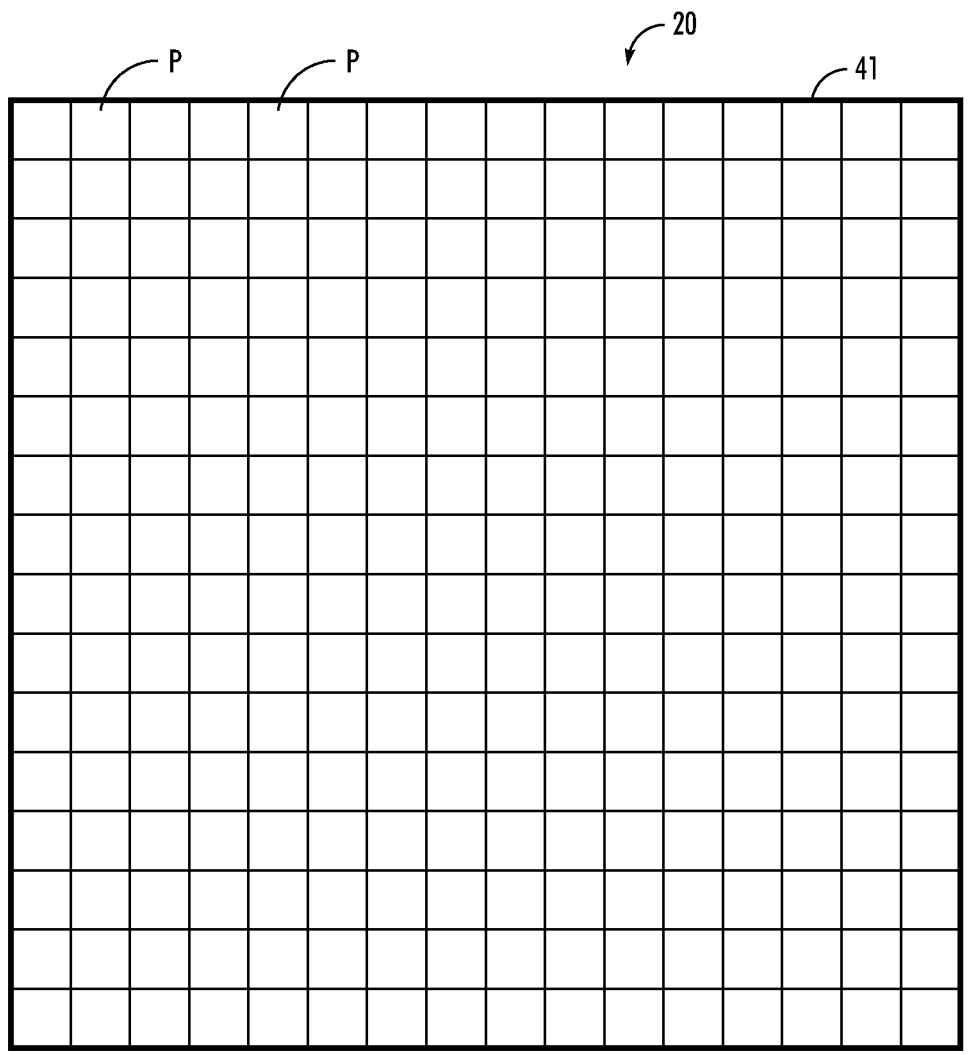
FIG. 2 is a schematic illustration of an embodiment of a pixel array.

FIG. 2 is a schematic illustration of an embodiment of an array 20 of pixel locations P that can be used to define the locations on a print output medium 41 that can be marked or printed. A marking of a particular primary color (e.g., cyan, magenta, yellow or black) that is printed or deposited at a pixel location can be conveniently called a dot.

Each pixel location P can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data (such as 32-bit or 24-bit pixel data), and halftoning (e.g., using one or more halftone threshold arrays) is commonly employed to map or transform continuous tone data to halftoned data that describes the primary color or colors, if any, that is/are to be printed at the corresponding output pixel location P. For example, the halftoned data can comprise one bit data per pixel per primary color or multi-bit data per pixel per primary color, wherein the multi-bit data contains fewer bits than the continuous tone data (e.g., eight or four bits).

Pursuant to half-toning, the array 20 more particularly comprises an array or collection of identically shaped halftone cells for each primary color, wherein the halftone cell configuration for each primary color can be different. Thus, each pixel P can have a different intra-cell location or position in the respective halftone cells for the different primary colors. A halftone cell includes a relatively small number of pixels, and each of the halftone cells for a primary color can have the same fill order. For convenience, pixels having the same intra-cell position or location in a particular primary color halftone cell array can be referred to as pixels that are correspondingly located in halftone cells for a primary color.

Figure 3:
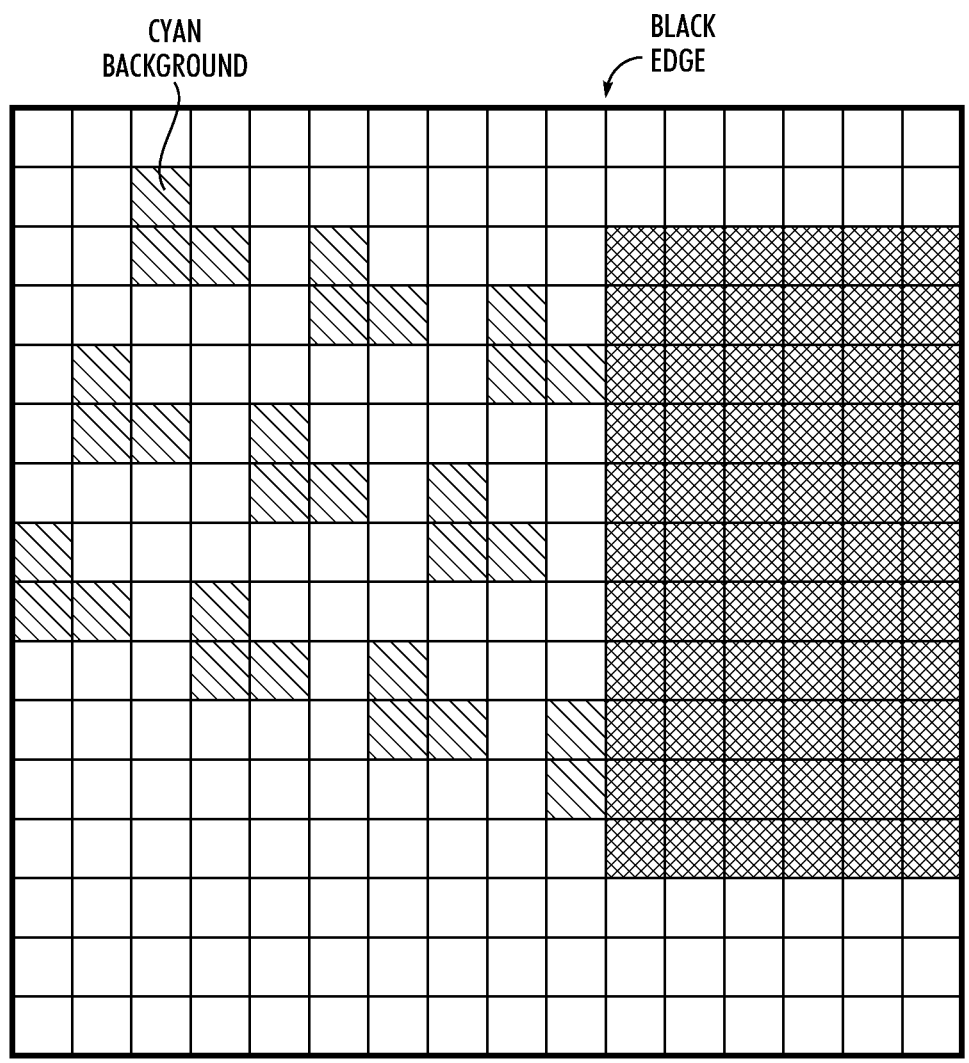
FIG. 3 is a schematic illustration of a black edge on a halftoned cyan background.

FIG. 3 shows a black edge on a halftoned cyan background. When there is misregistration between the cyan and black color planes, a white gap can appear between the cyan halftone dots and the black edge.

Figure 4:
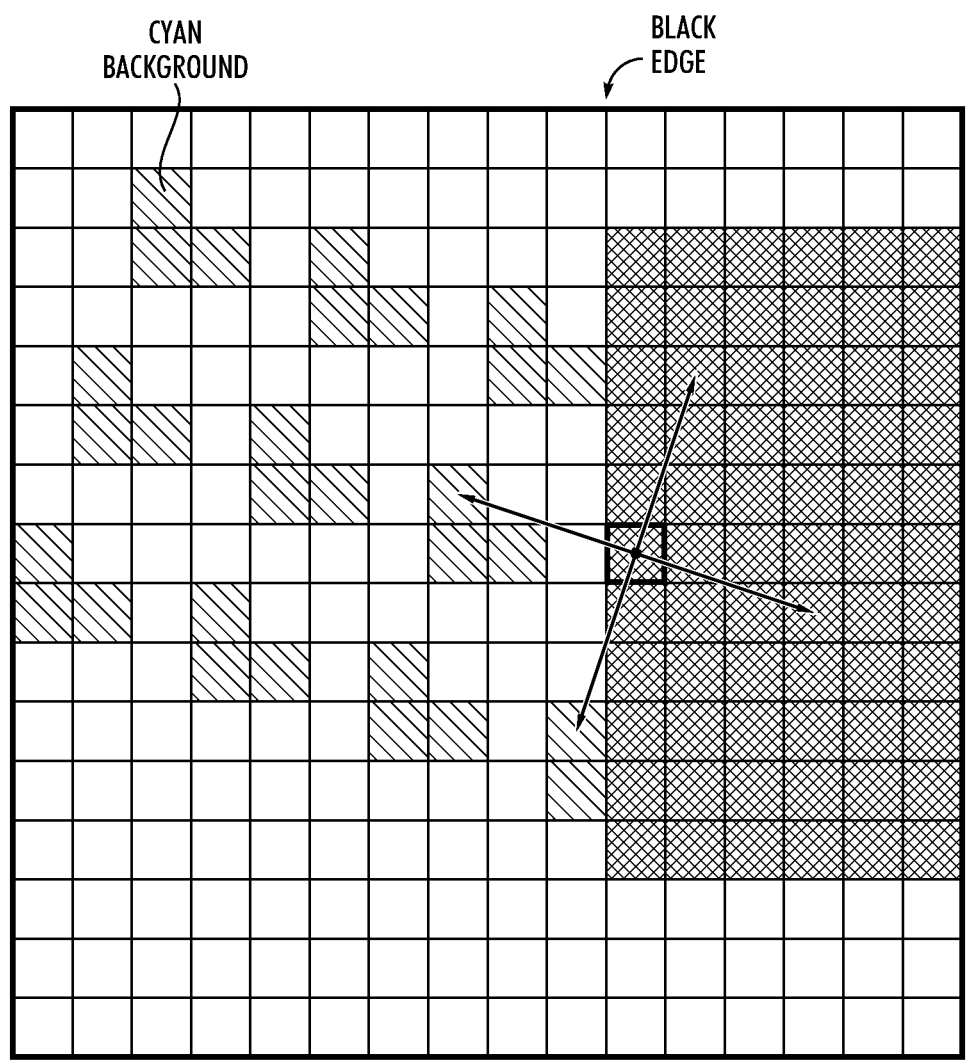
FIG. 4 is a schematic illustration of halftone screen vectors.

FIG. 4 shows illustrative examples of cyan screen vectors originating from a selected pixel that is on the black edge. Screen vectors can be used to locate correspondingly located pixels in neighboring cyan halftone cells.

Described heretofore is an algorithm for performing bitmap based black trapping according to the exemplary embodiments of this disclosure. It is to be understood the algorithm described can be executed by a printing apparatus and systems to perform methods of black trapping consistent with the disclosed algorithm.

Figure 5:
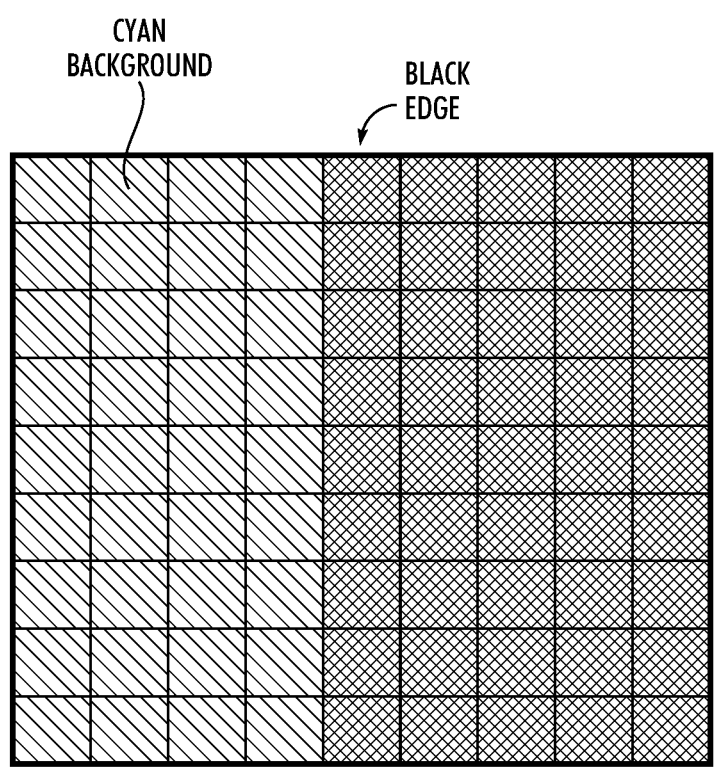
FIG. 5 is a schematic illustration of a black edge on a halftoned screen.

The first step of the algorithm identifies black pixels qualified for trapping. Using the cyan plane as an example, for the black pixel under consideration, the algorithm checks if there are any cyan pixels in a pre-specified neighborhood around the black pixel. The neighborhood controls the depth of trapping. For example, for 1-pixel trapping, this can be a 3×3 neighborhood centered on the current black pixel; for 2-pixel trapping, this can be a 5×5 neighborhood centered on the current black pixel, etc. If there is at least one cyan pixel in this neighborhood, the black pixel is a qualified candidate for adding cyan to it. For example, with reference to FIG. 5, for 1-pixel trapping, the first column of black pixels satisfy the condition of having a cyan pixel in the 3×3 neighborhood, therefore, the first column of black pixels are qualified candidates to have cyan added to them; the other columns of black pixels don't satisfy the condition, therefore, they do not have cyan added to them. The algorithm works similarly for the magenta and yellow planes.

Regarding the depth of trapping, 3×3 provides 1 pixel trapping in both the X and Y dimensions, 5×5 provides 2 pixel trapping in both the X and Y dimensions, 7×7 provides 3 pixel trapping in both the X and Y dimensions, and so on and so forth. These examples provide symmetrical trapping depth in both the X and Y dimensions when the print resolution is square, for example, 600 dpi×600 dpi. For non-square print resolutions, such as 1200 dpi×600 dpi, a 5×3 neighborhood is used to provide one 600 dpi pixel equivalent trapping depth in both the X and Y dimensions, a 9×5 neighborhood is used to provide two 600 dpi pixel equivalent trapping depth in both the X and Y dimensions, and a 13×7 neighborhood is used to provide three 600 dpi pixel equivalent trapping depth in both the X and Y dimensions. In other words, different resolutions require different neighborhood sizes to provide equivalent trapping depths. Notably, the above examples are for 600 dpi×600 dpi and 1200 dpi×600 dpi, but other resolutions are within the scope of this disclosure, for example, but not limited to, 1200 dpi×1200 dpi, 600 dpi×1200 dpi, 2400 dpi× 600 dpi, etc.

The second step of the algorithm estimates the C, M and Y continuous-tone color values around the qualified black pixel. Notably, counting the number of color pixels in the area is not a preferred manner to estimate the color values because the area likely includes an edge. For example, in FIG. 5, which is a solid cyan-black edge, cyan should have a continuous-tone value of 255, but counting cyan pixels in the area gives an estimate that is too low. In contrast, the disclosed algorithm uses the halftone screens that generated the halftoned bitmaps to estimate the color values.

Assume that the continuous-tone value of cyan is $C_i$ in the area. Halftoning would have been done as follows:
If $C_i > t(x,y)$, cyan is on
If $C_i <= t(x,y)$, cyan is off,
where $t(x,y)$ is the cyan halftone threshold at pixel location (x,y)

In other words, $C_i$ is greater than any halftone threshold that corresponds to a cyan pixel that is on in the area, and $C_i$ is less than or equal to any halftone threshold that corresponds to a cyan pixel that is off in the area. Therefore, all the pixels with cyan on are located, and the maximum value of the thresholds that correspond to these cyan pixels, Tc1, is obtained, leading to Ci>Tc1; similarly, all the pixels with no cyan are located, and the minimum value of the thresholds that correspond to the pixels with no cyan, Tc2, is obtained, leading to Ci<=Tc2. Thus, Tc1<Ci<=Tc2, indicating the range of the cyan continuous-tone value for a halftoned cyan area. However, when black edges are involved, as in the case of black trapping, Tc2 is not the preferred estimate because the black pixels turned the cyan pixels off (right side of FIG. 5). In such cases, Tc2 would be almost always 255. So, Tc1 is used as the estimated continuous-tone cyan value.

The window used for color estimation is centered on the black pixel in consideration, and should be large enough to cover a halftone cell in the color area. For example, a 7×7 window may be used for 600×600 dpi. The window does not have to be square, i.e., the height of the window can be reduced to use fewer raster lines and increase the width of the window to make it more hardware friendly. Again, estimates for magenta and yellow are obtained similarly.

In the case of color-gray edges, the amount of color added to black pixels at the edge may be reduced, otherwise gray text on a color background can get blurry:
If Tc1>Tk1, set Tc1=Tk1;
If Tm1>Tk1, set Tm1=Tk1;
If Ty1>Tk1, set Ty1=Tk1
where Tm1, Ty1, Tk1 are estimates of magenta, yellow and black continuous-tone values respectively for the area centered on the black pixel in consideration.

After the qualified black pixels are identified and the continuous-tone color estimates are obtained, the estimated C, M and Y values at the qualified black pixel locations are halftoned using the same halftones that generated the bitmaps. This adds color to the qualified black pixel locations depending on the halftoning results. The results are ORed with the original bitmap data.

Figure 6:
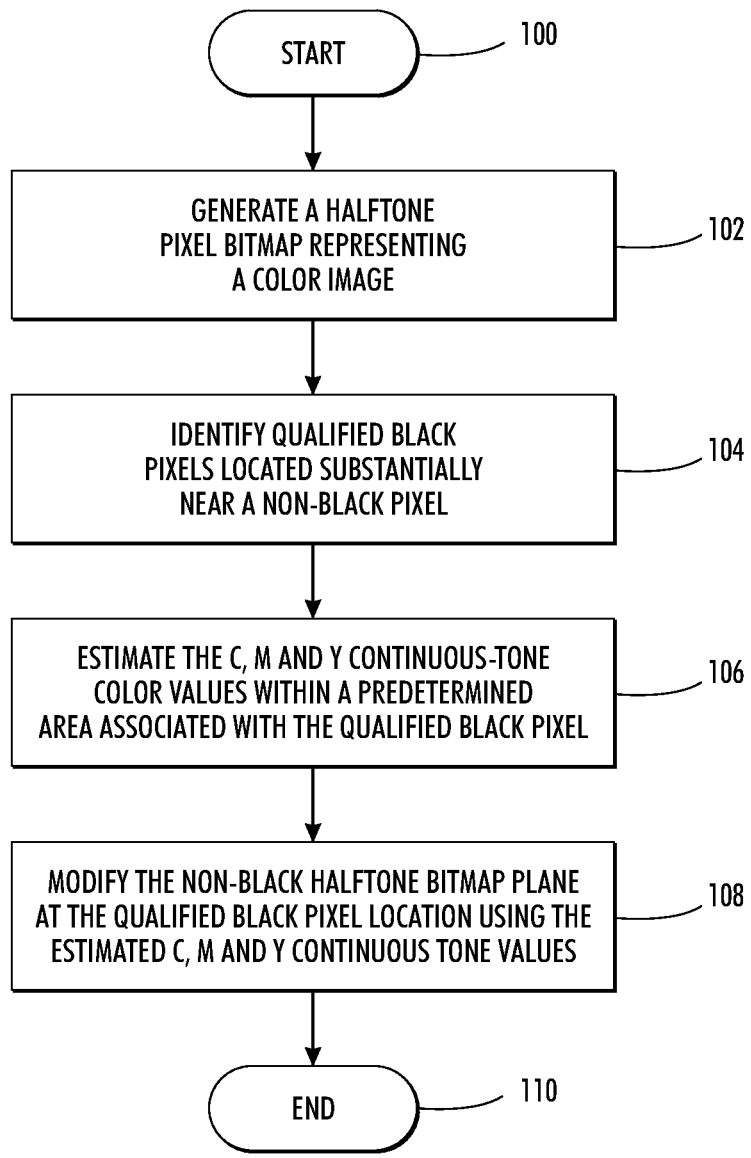
FIG. 6 is a schematic flow diagram of an exemplary embodiment of a procedure for modifying halftoned data for a selected pixel.

With reference to FIG. 6, illustrated is a flow chart diagram of an exemplary embodiment of an algorithm for modifying halftoned data for a selected pixel.

Initially, the execution of the algorithm starts 100 and a half tone pixel bitmap representing a color image for reproduction is generated 102.

Next, the algorithm identifies 104 qualified black pixels located substantially near a non-black pixel.

Next, the algorithm estimates 106 the C, M, and Y continuous-tone color values within a predetermined area associated with the qualified black pixel.

Next, the algorithm modifies 108 the non-black halftone bitmap plane at the qualified black pixel location using the estimated C, M and Y continuous tone valves.

Finally, the execution of the algorithm ends 110.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of performing black trapping on a color image data representation for rendering comprising:
    a) receiving a continuous tone data representation of a color image;
    b) generating a halftone pixel bitmap representing the color image, the halftone pixel bitmap including a black halftone pixel bitmap plane and one or more non-black pixel bitmap planes;
    c) identifying a qualified black pixel which is located substantially near a non-black pixel;
    d) estimating a continuous tone value associated with non-black pixels within a predetermined window of pixels associated with the qualified black pixel; and
    e) modifying the non-black halftone pixel bitmap plane at the qualified black pixel location using the estimated continuous tone value associated with the non-black pixels,
    wherein step d) estimates the continuous tone value associated with non-black pixels by determining a maximum halftone threshold associated with non-black pixels within the predetermined window and assigning the determined maximum halftone threshold as the estimated continuous tone value.

2. The method according to claim 1, wherein steps c)-e) are performed for all qualified black pixels associated with the halftone pixel bitmap.

3. The method according to claim 1, wherein step c) identifies a qualified black pixel which is associated with a non-black pixel within a predetermined neighborhood of pixels.

4. The method according to claim 3, wherein the predetermined neighborhood is centered on a pixel being identified as potentially a qualified black pixel.

5. The method according to claim 1, wherein the size of the predetermined window of pixels is equal to or greater than a halftone cell associated with the halftone pixel bitmap generated in step b).

6. A method of performing black trapping on a color image data representation for rendering comprising:
    a) receiving a continuous tone data representation of a color image;
    b) generating a halftone pixel bitmap representing the color image, the halftone pixel bitmap including a black halftone pixel bitmap plane and a plurality of primary colorant halftone pixel bitmap planes;
    c) identifying a qualified black pixel relative to each primary colorant plane, the qualified black pixel located substantially near a primary colorant pixel;
    d) estimating a continuous tone value associated with primary colorant pixels within a predetermined window of pixels associated with the qualified black pixel; and
    e) modifying the primary colorant halftone pixel bitmap plane at the qualified black pixel location using the estimated continuous tone values associated with the primary colorant pixels for each primary colorant plane.

7. A non-transitory computer program product comprising:
    a computer-usable non-transitory data carrier storing instructions that, when executed by a computer, cause the computer to perform a method of black trapping on a color image data representation for rendering, the method comprising:
    a) receiving a continuous tone data representation of a color image;
    b) generating a halftone pixel bitmap representing the color image, the halftone pixel bitmap including a black halftone pixel bitmap plane and one or more non-black pixel bitmap planes;
    c) identifying a qualified black pixel which is located substantially near a non-black pixel;
    d) estimating a continuous tone value associated with non-black pixels within a predetermined window of pixels associated with the qualified black pixel; and
    e) modifying the non-black halftone pixel bitmap plane at the qualified black pixel location using the estimated continuous tone value associated with the non-black pixels, wherein step d) estimates the continuous tone value associated with non-black pixels by determining a maximum halftone threshold associated with non-black pixels within the predetermined window and assigning the determined maximum halftone threshold as the estimated continuous tone value.

8. The non-transitory computer program product according to claim 7, wherein steps c)-e) are performed for all qualified black pixels associated with the halftone pixel bitmap.

9. The non-transitory computer program product according to claim 7, wherein step c) identifies a qualified black pixel which is associated with a non-black pixel within a predetermined neighborhood of pixels.

10. The non-transitory computer program product according to claim 9, wherein the predetermined neighborhood is centered on a pixel being identified as potentially a qualified black pixel.

11. The non-transitory computer program product according to claim 7, wherein the size of the predetermined window of pixels is equal to or greater than a halftone cell associated with the halftone pixel bitmap generated in step b).

12. A non-transitory computer program product comprising:
a computer-usable non-transitory data carrier storing instructions that, when executed by a computer, cause the computer to perform a method of black trapping on a color image data representation for rendering, the method comprising:
a) receiving a continuous tone data representation of a color image;
b) generating a halftone pixel bitmap representing the color image, the halftone pixel bitmap including a black halftone pixel bitmap plane and a plurality of primary colorant halftone pixel bitmap planes;
c) identifying a qualified black pixel relative to each primary colorant plane, the qualified black pixel located substantially near a primary colorant pixel;
d) estimating a continuous tone value associated with primary colorant pixels within a predetermined window of pixels associated with the qualified black pixel; and
e) modifying the primary colorant halftone pixel bitmap plane at the qualified black pixel location using the estimated continuous tone values associated with the primary colorant pixels for each primary colorant plane.

13. A printing apparatus comprising:
an image marking device for rendering a color image on a media substrate; and
a controller configured to receive a continuous tone representation of an image for rendering on the image marking device, the controller configured to execute instructions to perform a method of black trapping on the contone representation of the image, the method comprising:
a) receiving a continuous tone data representation of a color image;
b) generating a halftone pixel bitmap representing the color image, the halftone pixel bitmap including a black halftone pixel bitmap plane and one or more non-black pixel bitmap planes;
c) identifying a qualified black pixel which is located substantially near a non-black pixel;
d) estimating a continuous tone value associated with non-black pixels within a predetermined window of pixels associated with the qualified black pixel; and
e) modifying the non-black halftone pixel bitmap plane at the qualified black pixel location using the estimated continuous tone value associated with the non-black pixels,
wherein step d) estimates the continuous tone value associated with non-black pixels by determining a maximum halftone threshold associated with non-black pixels within the predetermined window and assigning the determined maximum halftone threshold as the estimated continuous tone value.

14. The printing apparatus according to claim 13, wherein steps c)-e) are performed for all qualified black pixels associated with the halftone pixel bitmap.

15. The printing apparatus according to claim 13, wherein step c) identifies a qualified black pixel which is associated with a non-black pixel within a predetermined neighborhood of pixels.

16. The printing apparatus according to claim 15, wherein the predetermined neighborhood is centered on a pixel being identified as potentially a qualified black pixel.

17. The printing apparatus according to claim 13, wherein the size of the predetermined window of pixels is equal to or greater than a halftone cell associated with the halftone pixel bitmap generated in step b).

18. A printing apparatus comprising:
an image marking device for rendering a color image on a media substrate; and
a controller configured to receive a continuous tone representation of an image for rendering on the image marking device, the controller configured to execute instructions to perform a method of black trapping on the contone representation of the image, the method comprising:
a) receiving a continuous tone data representation of a color image;
b) generating a halftone pixel bitmap representing the color image, the halftone pixel bitmap including a black halftone pixel bitmap plane and a plurality of primary colorant halftone pixel bitmap planes;
c) identifying a qualified black pixel relative to each primary colorant plane, the qualified black pixel located substantially near a primary colorant pixel;
d) estimating a continuous tone value associated with primary colorant pixels within a predetermined window of pixels associated with the qualified black pixel; and
e) modifying the primary colorant halftone pixel bitmap plane at the qualified black pixel location using the estimated continuous tone values associated with the primary colorant pixels for each primary colorant plane.

* * * * *